United States Patent
Roy-Chowdhury et al.

(10) Patent No.: US 8,234,713 B2
(45) Date of Patent: *Jul. 31, 2012

(54) ENFORCING ALIGNMENT OF APPROVED CHANGES AND DEPLOYED CHANGES IN THE SOFTWARE CHANGE LIFE-CYCLE

(75) Inventors: Rahul Roy-Chowdhury, San Francisco, CA (US); E. John Sebes, Menlo Park, CA (US); Jay Vaishnav, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/640,098

(22) Filed: Dec. 17, 2009

(65) Prior Publication Data

US 2010/0100970 A1     Apr. 22, 2010

Related U.S. Application Data

(63) Continuation of application No. 11/346,741, filed on Feb. 2, 2006, now Pat. No. 7,757,269.

(51) Int. Cl.
*H04L 9/32* (2006.01)
(52) U.S. Cl. ................ 726/26; 726/27; 726/30
(58) Field of Classification Search .......... 726/1–7, 726/26–30; 713/165–167
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,349 A | 7/1998 | Okonogi | |
| 5,787,427 A * | 7/1998 | Benantar et al. ............. | 1/1 |
| 5,842,017 A | 11/1998 | Hookway et al. | |

(Continued)

FOREIGN PATENT DOCUMENTS

EP   1 482 394 A2   12/2004

(Continued)

OTHER PUBLICATIONS

Barrantes et al., "Randomized Instruction Set Emulation to Disrupt Binary Code Injection Attacks," Oct. 27-31, 2003, ACM, pp. 281-289.

(Continued)

*Primary Examiner* — Hosuk Song
(74) *Attorney, Agent, or Firm* — Patent Capital Group

(57) ABSTRACT

On a host, host content change requests are intercepted in real-time. In a tracking mode, the change requests are logged and allowed to take effect on the host. In an enforcement mode, the change requests are logged and additionally compared against authorized change policies and a determination is made whether to allow the change to take effect or to block the changes, thereby enforcing the authorized change policies on the host. Tracking and enforcement can be done in real-time. In either mode and at any time, the logged changes can be reconciled against a set of approved change orders in order to identify classes of changes, including changes that were deployed but not approved and changes that were approved but not deployed.

34 Claims, 12 Drawing Sheets

U.S. PATENT DOCUMENTS

| | | | |
|---|---|---|---|
| 5,907,709 A | 5/1999 | Cantey et al. | |
| 5,974,149 A * | 10/1999 | Leppek | 713/164 |
| 5,987,611 A | 11/1999 | Freund | |
| 5,991,881 A | 11/1999 | Conklin et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,587,877 B1 | 7/2003 | Douglis et al. | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | |
| 6,988,124 B2 | 1/2006 | Douceur et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,346,781 B2 | 3/2008 | Cowle et al. | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,170 B2 | 3/2009 | Finnegan | |
| 7,546,333 B2 | 6/2009 | Alon et al. | |
| 7,607,170 B2 | 10/2009 | Chesla | |
| 7,657,599 B2 | 2/2010 | Smith | |
| 7,698,744 B2 | 4/2010 | Fanton et al. | |
| 7,757,269 B1 * | 7/2010 | Roy-Chowdhury et al. | 726/1 |
| 7,908,653 B2 | 3/2011 | Brickell et al. | |
| 7,937,455 B2 | 5/2011 | Saha et al. | |
| 8,015,563 B2 | 9/2011 | Araujo et al. | |
| 2002/0069367 A1 | 6/2002 | Tindal et al. | |
| 2002/0083175 A1 | 6/2002 | Afek et al. | |
| 2002/0099671 A1 | 7/2002 | Mastin et al. | |
| 2003/0023736 A1 | 1/2003 | Abkemeier | |
| 2003/0073894 A1 | 4/2003 | Chiang et al. | |
| 2003/0074552 A1 | 4/2003 | Olkin et al. | |
| 2003/0120601 A1 | 6/2003 | Ouye et al. | |
| 2003/0120811 A1 | 6/2003 | Hanson et al. | |
| 2003/0120935 A1 | 6/2003 | Teal et al. | |
| 2003/0145232 A1 | 7/2003 | Poletto et al. | |
| 2003/0167399 A1 | 9/2003 | Audebert et al. | |
| 2004/0003258 A1 | 1/2004 | Billingsley et al. | |
| 2004/0015554 A1 | 1/2004 | Wilson | |
| 2004/0051736 A1 | 3/2004 | Daniell | |
| 2004/0054928 A1 | 3/2004 | Hall | |
| 2004/0143749 A1 | 7/2004 | Tajali et al. | |
| 2004/0167906 A1 | 8/2004 | Smith et al. | |
| 2004/0230963 A1 | 11/2004 | Rothman et al. | |
| 2004/0243678 A1 | 12/2004 | Smith et al. | |
| 2004/0255161 A1 | 12/2004 | Cavanaugh | |
| 2005/0018651 A1 | 1/2005 | Yan et al. | |
| 2005/0108562 A1 | 5/2005 | Khazan et al. | |
| 2005/0114672 A1 | 5/2005 | Duncan et al. | |
| 2005/0228990 A1 | 10/2005 | Kato et al. | |
| 2005/0235360 A1 | 10/2005 | Pearson | |
| 2005/0257207 A1 | 11/2005 | Blumfield et al. | |
| 2005/0260996 A1 | 11/2005 | Groenendaal | |
| 2005/0262558 A1 | 11/2005 | Usov | |
| 2005/0273858 A1 | 12/2005 | Zadok et al. | |
| 2005/0283823 A1 | 12/2005 | Okajo et al. | |
| 2006/0004875 A1 | 1/2006 | Baron et al. | |
| 2006/0015501 A1 | 1/2006 | Sanamrad et al. | |
| 2006/0037016 A1 | 2/2006 | Saha et al. | |
| 2006/0080656 A1 | 4/2006 | Cain et al. | |
| 2006/0085785 A1 | 4/2006 | Garrett | |
| 2006/0101277 A1 | 5/2006 | Meenan et al. | |
| 2006/0133223 A1 | 6/2006 | Nakamura et al. | |
| 2006/0136910 A1 | 6/2006 | Brickell et al. | |
| 2006/0136911 A1 | 6/2006 | Robinson et al. | |
| 2006/0195906 A1 | 8/2006 | Jin et al. | |
| 2006/0236398 A1 | 10/2006 | Trakic et al. | |
| 2007/0011746 A1 | 1/2007 | Malpani et al. | |
| 2007/0039049 A1 | 2/2007 | Kupferman et al. | |
| 2007/0050764 A1 | 3/2007 | Traut | |
| 2007/0074199 A1 | 3/2007 | Schoenberg | |
| 2007/0083522 A1 | 4/2007 | Nord et al. | |
| 2007/0101435 A1 | 5/2007 | Konanka et al. | |
| 2007/0136579 A1 | 6/2007 | Levy et al. | |
| 2007/0169079 A1 | 7/2007 | Keller et al. | |
| 2007/0192329 A1 | 8/2007 | Croft et al. | |
| 2007/0253430 A1 | 11/2007 | Minami et al. | |
| 2007/0271561 A1 | 11/2007 | Winner et al. | |
| 2008/0005798 A1 | 1/2008 | Ross | |
| 2008/0052468 A1 | 2/2008 | Speirs et al. | |
| 2008/0082977 A1 | 4/2008 | Araujo et al. | |
| 2008/0120499 A1 | 5/2008 | Zimmer et al. | |
| 2008/0163207 A1 | 7/2008 | Reumann et al. | |
| 2008/0163210 A1 | 7/2008 | Bowman et al. | |
| 2008/0184373 A1 | 7/2008 | Traut et al. | |
| 2008/0294703 A1 | 11/2008 | Craft et al. | |
| 2008/0301770 A1 | 12/2008 | Kinder | |
| 2009/0038017 A1 | 2/2009 | Durham et al. | |
| 2009/0144300 A1 | 6/2009 | Chatley et al. | |
| 2009/0150639 A1 | 6/2009 | Ohata | |
| 2009/0249438 A1 | 10/2009 | Litvin et al. | |
| 2010/0114825 A1 | 5/2010 | Siddegowda | |
| 2010/0281133 A1 | 11/2010 | Brendel | |
| 2010/0293225 A1 | 11/2010 | Sebes et al. | |
| 2011/0035423 A1 | 2/2011 | Kobayashi et al. | |
| 2011/0077948 A1 | 3/2011 | Sharma et al. | |
| 2011/0093842 A1 | 4/2011 | Sebes | |
| 2011/0093950 A1 | 4/2011 | Bhargava et al. | |

FOREIGN PATENT DOCUMENTS

| | | |
|---|---|---|
| EP | 2 037 657 A1 | 3/2009 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

Gaurav et al., "Countering Code-Injection Attacks with Instruction-Set Randomization," Oct. 27-31, 2003, ACM, pp. 272-280.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/844,892, entitled "System and Method for Protecting Computer Networks Against Malicious Software," filed Jul. 28, 2010, Inventor(s) Rishi Bhargava, et al.

U.S. Appl. No. 12/844,964, entitled "System and Method for Network Level Protection Against Malicious Software," filed Jul. 28, 2010, Inventor(s) Rishi Bhargava, et al.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/944,567, entitled "Classification of Software on Networked Systems," filed Nov. 11, 2010, Inventor(s) E. John Sebes, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/022,148, entitled "Execution Environment File Inventory," filed Feb. 7, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

IA-32 Intel® Architecture Software Developer's Manual, vol. 3B, Jun. 2006; pp. 13, 15, 22 and 145-146.

Kurt Gutzmann, "Access Control and Session Management in the HTTP Environment," Jan./Feb. 2001, pp. 26-35, IEEE Internet Computing.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Richi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, Inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al. (1047).

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al. (1049).

* cited by examiner

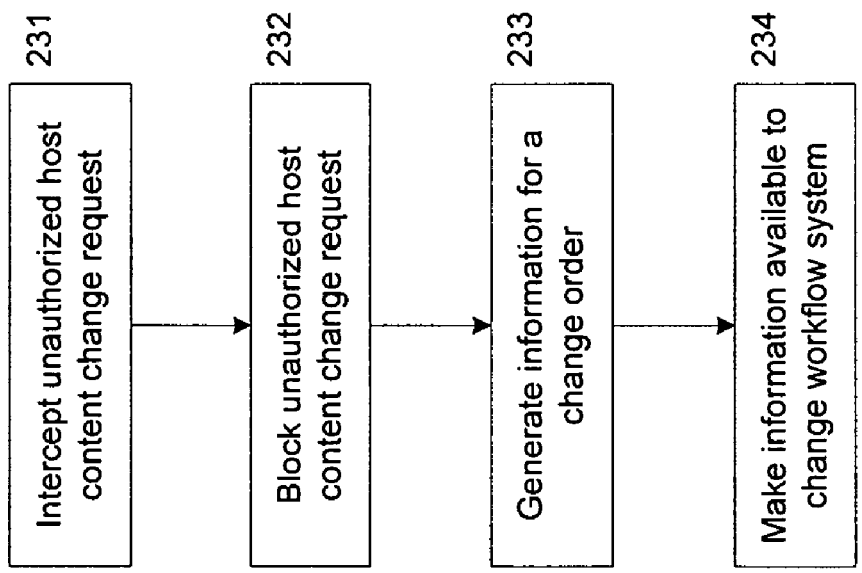

ENFORCING ALIGNMENT OF APPROVED CHANGES AND DEPLOYED CHANGES IN THE SOFTWARE CHANGE LIFE-CYCLE

RELATED APPLICATION

This patent application is a continuation (and claims the benefit of priority under 35 U.S.C. §120) of U.S. application Ser. No. 11/346,741 now U.S. Pat. No. 7,757,269, filed Feb. 2, 2006, entitled ENFORCING ALIGNMENT OF APPROVED CHANGES AND DEPLOYED CHANGES IN THE SOFTWARE CHANGE LIFE-CYCLE. The disclosure of the prior application is considered part of (and is incorporated by reference in) the disclosure of this application.

BACKGROUND

1. Field

The invention relates to software changes, and more particularly to tracking changes, enforcing authorized change policies, and reconciling deployed changes against approved change orders.

2. Related Art

The maintenance of hosts in information technology infrastructures typically involves changes or updates to the software of the systems. Changes can include program updates, configuration file changes, security configuration changes, etc. There are two general processes involved in making software changes. The first is a process for approving software change orders, such as a process wherein staff members propose changes to the software set of one or more hosts and a review body approves or rejects individual change orders (sometimes referred to as "engineering change orders" or ECOs). The second is a process for deploying software changes and updates on one or more hosts, a process that can incorporate any degree of automation to "push" software changes onto the hosts.

An important challenge today is the lack of visibility into how closely the set of deployed changes matches the set of approved change orders, and what changes are outside of that intersection, including deployed changes that were not approved and approved change orders that are not yet deployed. A related challenge is the lack of available enforcement mechanisms today for blocking undesired changes on hosts. Yet another related challenge is the lack of visibility into the actual set of deployed changes on a host, regardless of whether the changes were desired, undesired, known or even unknown. These challenges are important from a variety of perspectives, including system availability and uptime, system security, and compliance with legal regulations such as the Sarbanes Oxley Act of 2002 and the Federal Information Security Management Act (FISMA).

The above challenges are at the root of why today the software change deployment process and the software change approval process are two generally disconnected processes. In the software change approval process, a request is submitted for the approval of one or more changes to one or more hosts, and approved change orders (if any) are recorded for future reference. In the software change deployment process, a change to a system is deployed by a person, an automated program, or via a hybrid process. Any reconciliation or audit of the deployed changes against the approved change orders is done generally by humans comparing system logs indicating a set of deployed changes against a list of approved change orders, often using physical records (such as paper printouts) to do tedious manual comparisons. Matching entries in the two sets allows identification of discrepancies, such as deployed changes that are not approved and approved changes that are not deployed, which can then be addressed. Needless to say, this is resource-intensive due to the partially or completely manual nature of the verification process. It is also error prone simply because of scale and statistically inevitable errors due to human involvement in the process, making it indefensible to outside auditors demanding reasonable proof that the deployed changes match the approved change orders. Furthermore, the change approvals are not enforceable because today changes that are not approved cannot be automatically blocked from becoming deployed and taking effect on a host.

Accordingly, there is a need for methods and systems for aligning deployed changes and approved change orders in the software change life-cycle, allowing tracking of deployed or attempted changes, allowing enforcement of authorized change policies by blocking unauthorized changes, and affording visibility into how the set of deployed changes relates to the set of approved change orders.

SUMMARY

On a host, host content change requests are intercepted in real-time. In a tracking mode, the change requests are logged and allowed to take effect on the host. In an enforcement mode, the change requests are logged and additionally compared against authorized change policies and a determination is made whether to allow the change to take effect or to block the changes, thereby enforcing the authorized change policies on the host. Tracking and enforcement can be done in real-time. In either mode and at any time, the logged changes can be reconciled against a set of approved change orders in order to identify classes of changes, including changes that were deployed but not approved and changes that were approved but not deployed.

BRIEF DESCRIPTION OF DRAWINGS

FIG. 9 is a flow diagram illustrating one example where such visibility allows integration of the software change cycle and change workflow, according to an embodiment of the present invention.

DETAILED DESCRIPTION

Figure 1:
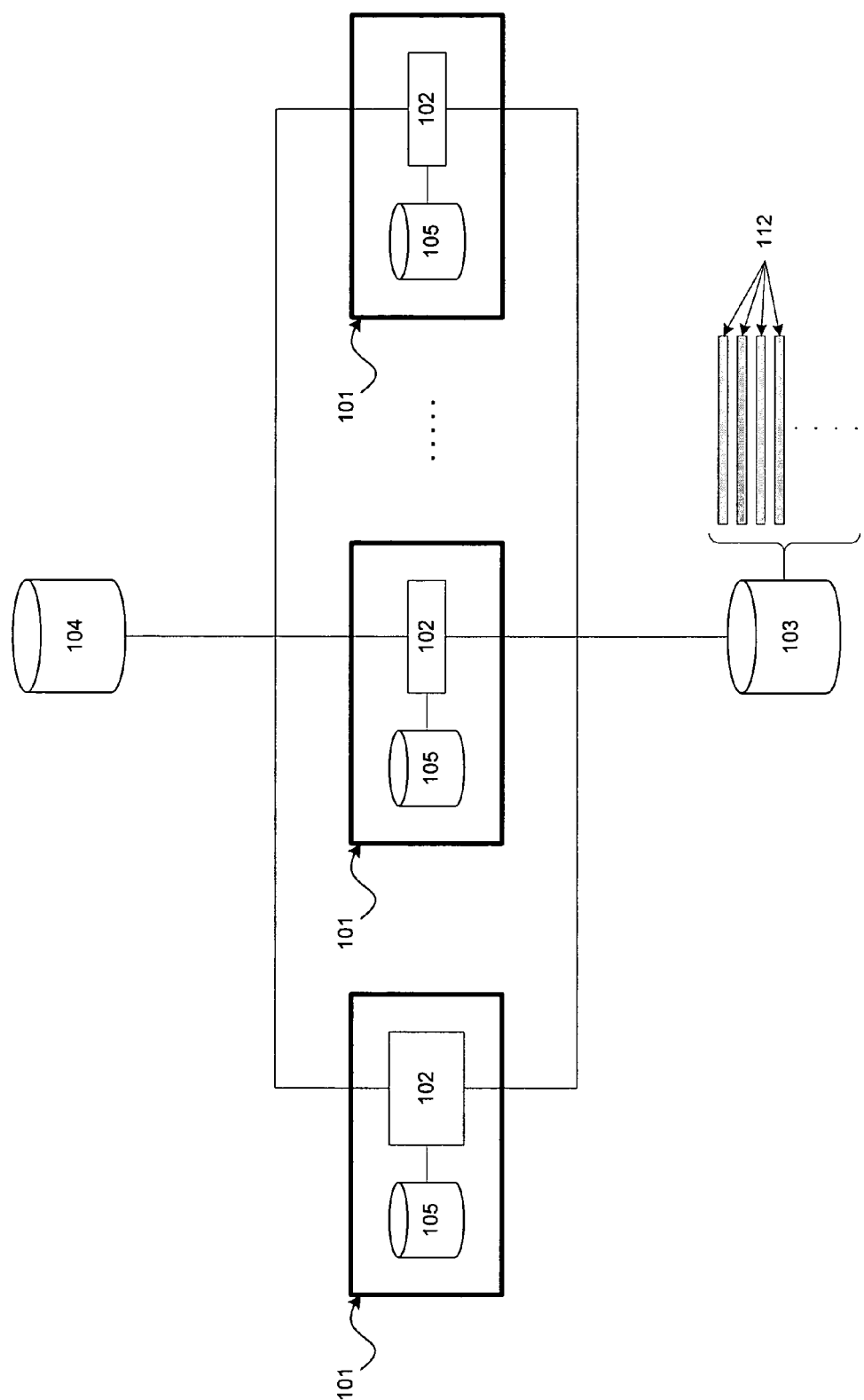
FIG. 1 is a diagram illustrating a system for tracking changes, according to an embodiment of the present invention.

The following serves as a glossary of terms as used herein:

Host: Any computer, computing machine, or computer system comprising an operating system (OS) and a set of persistent objects residing on the host. Examples of hosts include: servers, computing appliances, controllers, workstations, desktop and laptop computers, handheld devices, cellular devices, etc. Examples of such objects include: files, directories and related data structures managed by a file system of the host's operating system; system registry entries, such as managed by a MICROSOFT WINDOWS™ operating system; objects (such as data, stored procedures (SPROCs), etc.) managed by a Database Management System (DBMS); etc.

Host content change: On a host, any modification of a persistent object of the host or modification of the set of persistent objects of a host. Examples of modification include setting or changing one or more attributes of an object, writing to an object, renaming an object, moving an object, deleting an object, creating a new object, etc. The particular definition of a host content change can vary by implementation, and may be broadened to include the operation of reading all of part of the contents or attributes of an existing object.

Host content change attempt: An attempt to perform a host content change. Such an attempt generally comprises a corresponding host content change request submitted to the file system, to the system registry, to a DBMS, or to any other mechanism that services the change request and manages the persistent object that represents the target of the change attempt. When such a corresponding host content change request is allowed to proceed and the corresponding modification takes effect (i.e. is "deployed"), the result is a deployed host content change (unless an error prevents such deployment to complete). In contrast, when such a corresponding host content change request is blocked or denied, it is prevented from resulting in a deployed host content change.

Change order: A request which explicitly or implicitly indicates a set of one or more host content changes on one or more hosts. An approved change order is a change order whose indicated changes have been approved, via some change workflow process, for deployment on one or more hosts. A set of one or more approved change orders may reside anywhere and in any format or structure, including physical form (such as on paper) and digital form (such as in a file, database, network storage or other repository). A set of approved change orders may be specified in any number of ways, such as indicating one or more of the following: which persistent objects are to be changed; what type of change is approved for each persistent object; which user(s) or program(s) or other entities may initiate the indicated changes; during which time windows and under what circumstances the changes may be initiated; and any other restrictions or qualifications on the deployment of the indicated changes.

Change approval process (herein also referred to as change workflow): Any process for managing and approving change orders. A change approval process may be human-based, automated or may comprise a hybrid process or system. Example change approval processes include workflows for creating and approving "engineering change orders" (ECO) in a production environment wherein the software (or other persistent objects) of one or more hosts undergo changes or updates.

Overview

The present invention bridges a gap between the traditionally disconnected processes of software change deployment and software change approval, by providing visibility into the changes that are deployed on a host, by enforcing authorized change policies through proactive blocking of unauthorized changes, and by reconciling a set of deployed changes against a set of approved change orders to assess a true state of a host (indicated by the set of deployed changes) versus a desired state of a host (indicated by the set of approved change orders).

Note that a distinction is made between the two related but independent concepts of authorization and approval: authorization pertains to host content changes, whereas approval pertains to change orders. An authorized host content change is a change that conforms to a set of defined "change authorization policies", regardless of whether there is an approved change order related to the authorized change or not. Similarly, an approved change order is a change order that has been undergone approval via a change workflow, regardless of whether there are any change authorization policies in place which authorize any related host content changes or not. As described below, one advantage of the present invention is that it connects change authorizations and change approvals.

While OS access control provisions might represent a first candidate mechanism for enforcing authorized change policies on a host, it is generally not practical to translate change regimes, such as the enforcement of a set of human-indicated authorized change policies, into a set of permissions typically implemented by OS access control provisions. This is partly so because OS permissions, such as placement and execution of files in directories that are covered by access control privileges, do not easily map to the needed human world semantics for change deployment, change authorization and change order approvals. Furthermore, even if some of the needed semantics could be implemented with OS provided access control mechanisms, the mere re-use of existing OS mechanisms implies that the implemented regimes can be modified by anyone with OS access control privileges on the host, an implication that is not always desirable.

In contrast, the present invention defines the notion of a host content change, adds a layer of filtering and selection whereby events can be identified as either content changes or non-changes, and allows for change tracking and enforcement of change regimes in real-time and independently of operating system access controls. Furthermore, in contrast to implementations using existing OS access control mechanisms, the authorized change policies of the present invention can be protected from manipulation by individuals or programs with OS access control privileges on the host, such as local users or administrators, software installers and updaters, malware, etc. Instead, the privilege and ability to make changes to the host or to the authorized change policies are placed with another computer system that is separate from the host. One example of this approach uses digital signatures for authentication and proof of privilege, as well as checksums for detecting tampered change authorization policies or other data on host, as described for instance in U.S. Pat. No. 7,873, 955, which issued Jan. 18, 2011, from U.S. patent application Ser. No. 10/935,772, entitled "Solidifying the Executable Software Set of a Computer" and filed on Sep. 7, 2004, and which is incorporated herein in its entirety for all purposes.

Additionally, the concepts presented herein relate to the following co-pending U.S. patent applications and issued U.S. Patents, which are incorporated herein in their entirety for all purposes: co-pending U.S. patent application Ser. No. 10/651,591, entitled "Method And System For Containment of Networked Application Client Software By Explicit Human Input" and filed on Aug. 29, 2003; U.S. Pat. No. 7,464,408, which issued Dec. 9, 2008 from U.S. patent application Ser. No. 10/651,588, entitled "Damage Containment By Translation" and filed on Aug. 29, 2003; U.S. Pat. No. 7,783,735, which issued Aug. 24, 2010 from U.S. patent application Ser. No. 10/806,578, entitled "Containment Of Network Communication" and filed on Mar. 22, 2004; U.S. Pat. No. 7,840,968, which issued Nov. 23, 2010 from U.S. patent application Ser. No. 10/739,230, entitled "Method And System For Containment Of Usage Of Language Interfaces" and filed on Dec. 17, 2003; co-pending U.S. patent application Ser. No. 11/060,683, entitled "Distribution and Installation of Solidified Software on a Computer" and filed on Feb. 16, 2005; U.S. Pat. No. 7,603,552, which issued Oct. 13, 2009 from U.S. patent application Ser. No. 11/122,872, entitled "Piracy Prevention Using Unique Module Translation" and filed on May 4, 2005; U.S. Pat. No. 7,856,661, which issued Dec. 21, 2010 from U.S. patent application Ser. No. 11/182,320, entitled "Classification of Software on Networked Systems" and filed on Jul. 14, 2005.

FIG. 1 is a diagram illustrating a system for tracking changes, according to an embodiment of the present invention. The Figure shows one or more hosts 101, each having an installed OS and optionally other mechanisms which collectively manage the host's particular set of persistent objects 105 and which service host content change requests, as described above. To implement change tracking and/or change enforcement on a host 101 and thereby gain real-time visibility into attempted and deployed host content changes, the host 101 comprises a piece of software 102 hereinafter referred to as an "agent".

The agent 102 uses one or more mechanisms to intercept system content change requests on the host 101. There are well-known techniques for intercepting system content change requests, such as using shims, wrappers or proxies to intercept file system requests, system registry requests, DBMS requests, etc.

In an exemplary implementation, file system requests can be intercepted by using a module (or "shim") employed within the OS kernel and inserted into the file system stack such that file system requests pass through the module. This allows the agent 102 to intercept file system requests as they travel through the file system stack, examine them, and perform any additional actions or processing as described below. By way of example, such a module may be implemented as a Filter Driver in a MICROSOFT™ WINDOWS™ OS, as a kernel module in a LINUX™ OS, or implemented similarly in other operating systems. Similar shimming techniques can be used to intercept change requests submitted to other managers of persistent objects on the host 101.

In another exemplary implementation, a wrapper library can be interposed between programs that make system calls representing file system change requests (e.g. application programs) and the actual libraries implementing the system calls (or at least the initial entry points to the system calls). Examples of such libraries are "kernel32.dll" in a MICROSOFT™ WINDOWS™ OS or "libc" in a LINUX™ OS. In such embodiments, such a wrapper library implements the agent's 102 interception of file system change requests. Similar techniques involving wrappers can be used to intercept change requests submitted to other managers of persistent objects on the host 101, such as a system registry manager or a DBMS.

In some implementations, the OS and/or other managers of persistent objects may explicitly make available an interception mechanism for use by third parties, such as the filter driver mechanisms provided by MICROSOFT™ WINDOWS™ OS. In yet other implementations, a manager of persistent objects (such as a DBMS) on host 101 is made available via a proxy, and the proxy is used to intercept change requests targeted at the persistent objects. The inventive techniques outlined herein are independent of the particular interception mechanisms used by agent 102.

There are two broad modes of operation for an agent 102: (1) a tracking mode, and (2) an enforcement mode. In tracking mode, the agent 102 keeps track of changes to the persistent objects of the host 101 and logs the changes by entering change log entries 112 in a log 103. The tracking is preferably done in real-time, since the changes can be intercepted and logged in real-time as they occur, but it need not necessarily be done in real-time. In enforcement mode, the agent 102 not only records changes to the persistent objects of the host 101 in the log 103, but it also blocks (in real-time) change attempts which are not known to the agent 102 to represent "authorized changes". These two modes will be described in more detail below. As will be apparent to one of ordinary skill in the art, while some of the functionalities of the present invention are preferably implemented within the OS kernel (depending on OS), many of the functionalities can be implemented outside of the kernel in user space, thereby increasing implementation efficiency and modularity of components.

As shown in FIG. 1, log 103 is a multi-host log that aggregates change logs entries 112 from one or more agents 102 which track changes on one or more hosts 101. Each agent 102 may log changes locally on its respective host 101 before forwarding the local logs to log 103.

Tracking Mode

Figure 2:
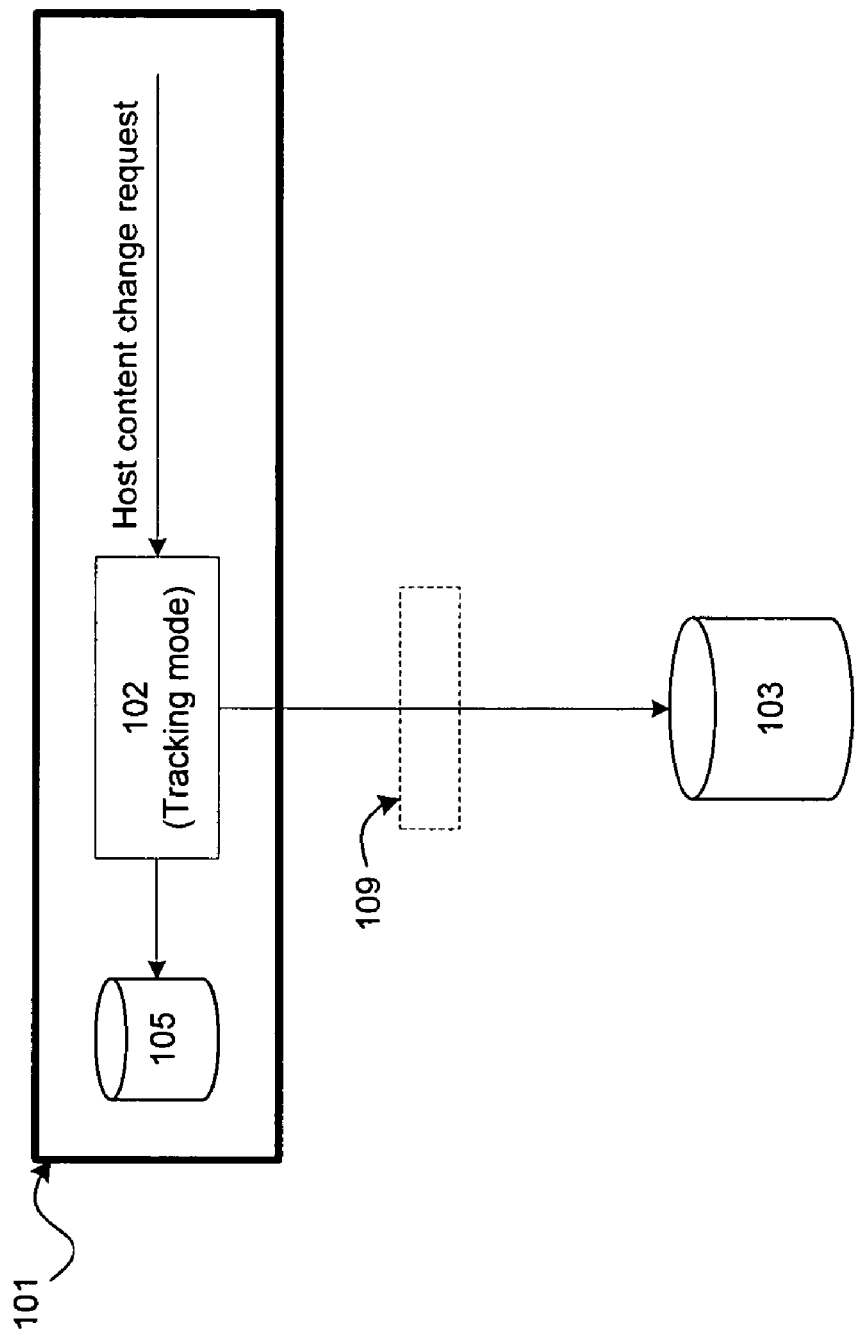
FIG. 2 is a diagram illustrating a system for tracking changes, according to an embodiment of the present invention.

FIG. 2 is a diagram illustrating a system for tracking changes, according to an embodiment of the present invention. In this embodiment, agent 102 operates in tracking mode. Agent 102 intercepts a host content change request, logs the requested change into log 103 (or optionally logs it locally for later forwarding to log 103), and allows processing of the change request to continue so that the corresponding change may take effect. A change log entry 112 (hereinafter also referred to as a change record) describing a particular change may comprise one or more of:

the host 101 on which the change occurred;
nature of the change, for example whether the change was a "create", "delete", "rename", "move" or "write" operation, whether the change set or modified an attribute of the persistent objects, etc.;
time of the change;
attributes of the changed object prior to the change taking effect, such as object name, object type, object size, full path of object (such as the full path of a file in the file system, or a fully qualified name of a registry entry);
attributes of the changed object after the change taking affect, such as object name, object type, object size, full path of the object, permissions set for the object, etc.;
information on who initiated the change, such as a user name or user ID, a name of an executable when the change was initiated by an executable, etc.;

full name of the program file that the process, which initiated the change, was executing; note that there is such a process, regardless of whether the change was initiated by manual activity of a user (in which case, for example, the process may be a login shell or an application program being used by the user) or by an automated process, such a software provisioning agent or an automatic software updater;

when the change alters the contents of the object, a set of one or more differences (i.e. one or more "cliffs") illustrating one or more parts of the object contents before and after the change.

Prior to committing a change record to the log 103, the agent 102 may optionally use a filter 109 to prevent changes that are considered uninteresting or "noise" from being committed to log 103. What in particular is considered noise at this stage of logging is entirely subjective and is typically host-specific. One example of a typically practical choice is to consider operations on temporary objects (such as temporary files, registry entries or database objects) as noise and filter them out so they are not recorded in the log 103. As another example, it may be convenient to exclude creation or modification of one or more specified registry entries (for example a set of registry entries that indicate mouse movements in a MICROSOFT™ WINDOWS™ operating system) and consider them as uninteresting noise.

In general, any logic may be employed by the filter 109, the logic taking as input any of the attributes (enumerated above) of the change record. In addition, the filter 109 logic may take as input other information not necessarily recorded in the change record itself but nevertheless available to the filter 109. For example, in the case of a change record originating at a host 101, such other information may comprise a department or business unit name to which the host 101 belongs, the host's 101 place within a hierarchy of hosts 101, whether the business is in a particularly sensitive time period during which host content changes should be kept at a minimum, etc.

Figure 3:
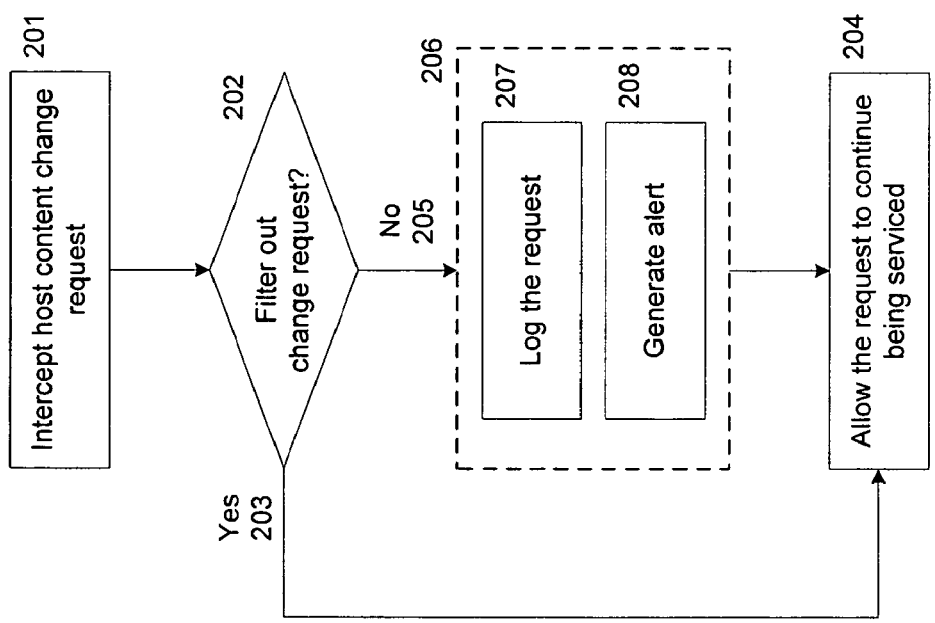
FIG. 3 is a flow diagram illustrating a method for tracking changes, according to an embodiment of the present invention.

FIG. 3 is a flow diagram illustrating a method for tracking changes, according to an embodiment of the present invention. In this embodiment, agent 102 on host 101 is operating in tracking mode. At step 201, agent 102 intercepts a host content change request. At the optional step 202, the agent 102 determines whether the host content change request represents "noise" or is otherwise uninteresting and therefore should be filtered out from entry into the log 103. If so 203, the request is not logged and the agent 102 allows 204 the request to continue being serviced. Otherwise 205, the agent 102 processes 206 the change request in addition to allowing 204 the request to continue being serviced. The processing 206 comprises generating 207 a change log entry 112 and/or issuing 208 an alert indicating one or more details of the change request and/or the fact that the request was allowed to continue being serviced (the ordering of 204 and 206 can be reversed). Note that the interception 201 and processing 206 can proceed in real-time, whereby the log 103 can provide a real-time up-to-date account of the set of changes being attempted and/or deployed on host 101. Optionally and as described above, agent 102 performs analogous processing 206 for requests that are not necessarily modifications of persistent objects on host 101, but may represent a broadening of the definition of content change, including operations such as "reading" or "viewing" or "accessing" of objects, or "executing" or "running" objects (for objects that represent a set of instructions that can be executed or interpreted on the host 101), thereby recording a more complete picture of activity on host 101.

Enforcement Mode

Figure 4:
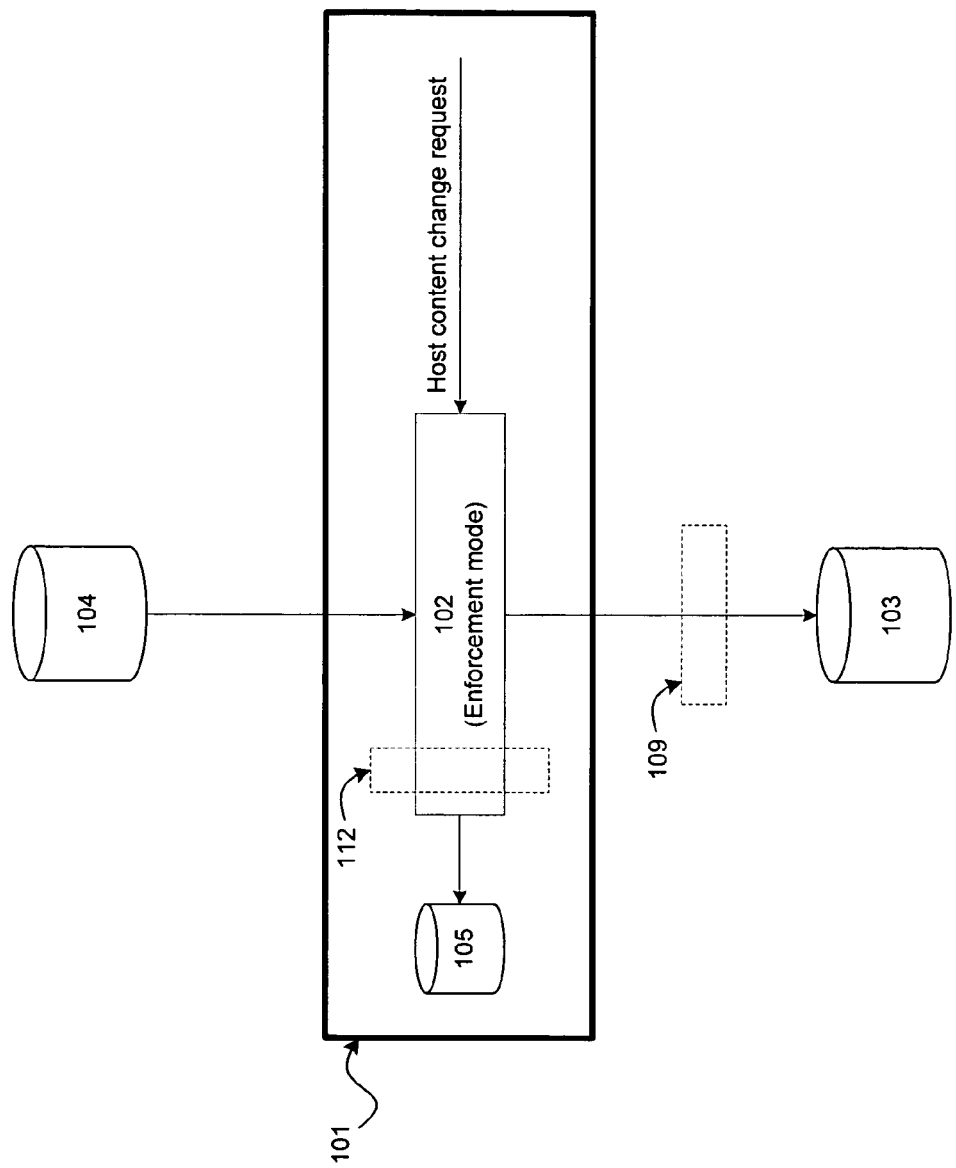
FIG. 4 is a diagram illustrating a system for tracking changes and enforcing authorized change policies, according to an embodiment of the present invention.

FIG. 4 is a diagram illustrating a system for tracking changes and enforcing authorized change policies, according to an embodiment of the present invention. In this mode, the agent 102 intercepts host content change requests as in the tracking mode, but in addition decides whether to block the request and disallow the change, or to allow the request to continue being serviced. To make this decision, the agent 102 has access to an "authorized change policy" repository 104 which indicates what changes are authorized and what changes are not authorized. There are many ways to indicate this, but fundamentally the authorized change policy repository 104 explicitly or implicitly indicates which actors (i.e. users, programs or other entities that initiate host content changes) are authorized to make what changes to what persistent objects under what circumstances. Example authorized change policies include:

Indicating a set of persistent objects that are authorized to be changed without restriction;

Indicating a set of actors that are authorized to make changes to a specified set of objects at any time;

Indicating a set of actors that are authorized to make changes to a specified set of objects during specified time windows;

The authorized change policy repository 104 may be stored locally on each host 101, stored remotely and made available on-demand to one or more agents 102 via a network or via periodic replication onto local hosts 101, or stored and accessed in a distributed manner. The particular location and/or distribution of the repository 104 do not matter, as long as the authorized change policy information is accessible to agent 102.

Figure 5:
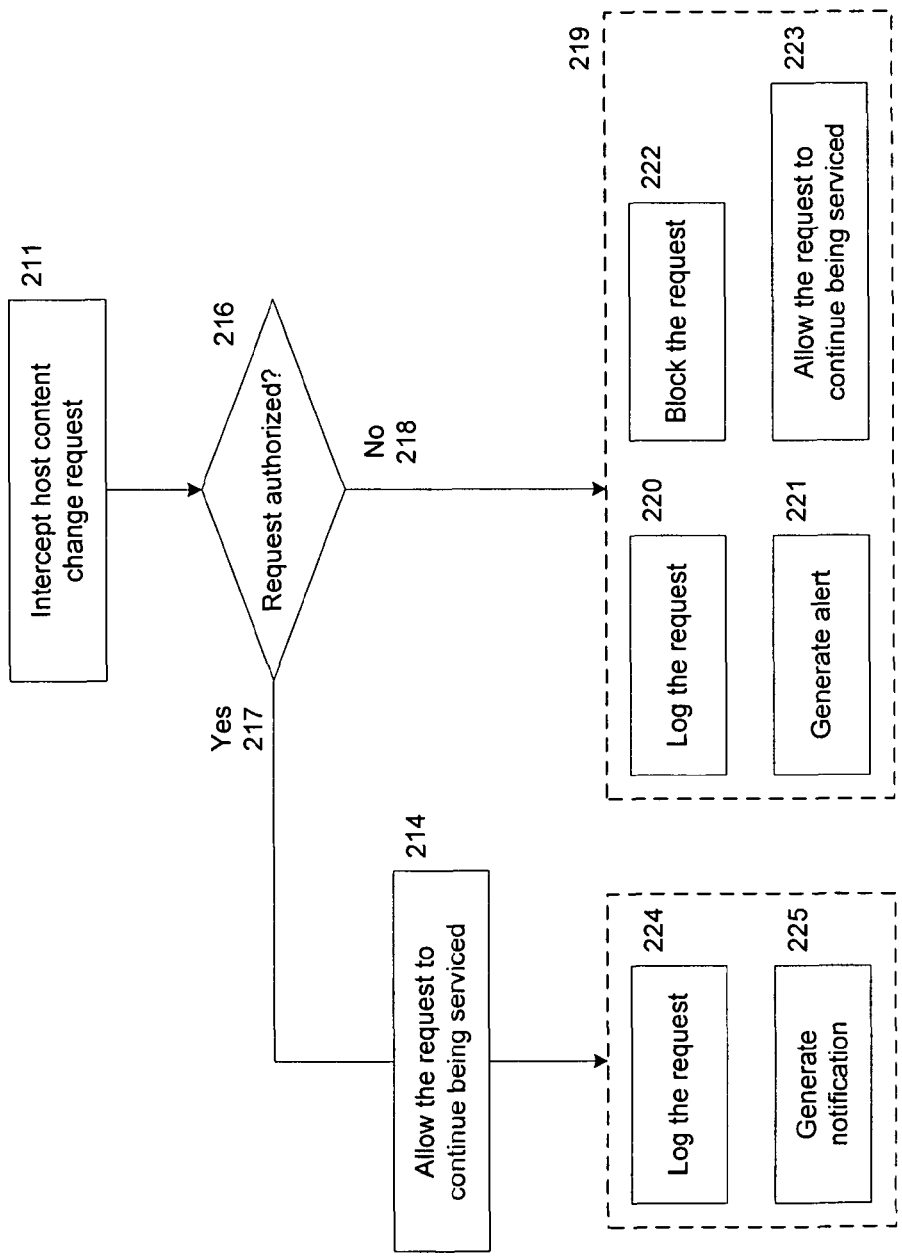
FIG. 5 is a flow chart illustrating a method for the enforcement of authorized change policies, according to an embodiment of the present invention.

FIG. 5 is a flow chart illustrating a method for the enforcement of authorized change policies, according to an embodiment of the present invention. In this embodiment, agent 102 on host 101 is operating in enforcement mode. At step 211, agent 102 intercepts a host content change request. At step 216, the agent 102 determines whether the requested change is authorized. As described above, this determination is made according to an authorized change policy. If the change is 217 authorized, the agent 102 allows 214 the request to continue being processed, optionally also logging 224 the request and/or generating 225 a change notification. Otherwise, if the change is not 218 authorized, the agent 102 processes 219 the request by performing one or more actions. Such actions on unauthorized changes may include one or more of the following:

logging 220 the change request;

generating 221 an alert, such as an email alert, a paging alert, or an alert using a mechanism specifically set up to notify a system or a human of unauthorized change attempts;

blocking 222 the change request, which can be accomplished for example by not allowing the change request to continue being serviced and instead returning (i.e. blocking) the request, optionally with an appropriate error message;

allowing 223 the change request to continue being serviced, instead of blocking the unauthorized change.

Optionally, and analogous to above description in the context of the tracking mode, agent 102 can perform analogous processing for requests that are not necessarily modifications of persistent objects on host 101, but may represent a broadening of the definition of content change, including operations such as "reading" or "viewing" or "accessing" of objects, or "executing" or "running" objects (for objects that represent a set of instructions that can be executed or interpreted on the host 101), thereby enforcing not just change control, but also access control and/or execution control, thereby providing more complete and varied control over activity on host 101.

Note that the interception and the actions in 219 can proceed in real-time, in which case the logs 103 provide a real-time up-to-date account of the set of changes, including which changes were blocked. Furthermore, note that throughout the present description, generated change log entries 112 or alerts about a host content change request may include any number of details about the request, including whether the request was a change request, whether the requested change was authorized or unauthorized, etc.

One particularly useful way of gradually tightening a deployment in the enforcement mode is to start out by defining a set of authorized change policies and instructing one or more agents 102 on one or more hosts 101 to log unauthorized changes but nevertheless allow the requests for unauthorized changes to continue being serviced, for an initial period. This initial period allows an assessment of the frequency and nature of unauthorized changes without disturbing the system by blocking changes that are not deemed authorized according to the defined authorized change policies. During such an initial period, the authorized change policies can be refined and their effects observed. Once the authorized change policies are satisfactory, the agents 102 can be instructed to switch to enforcement mode and block unauthorized change requests.

Reconciliation

The set of change logs 103, aggregated from a set of one or more hosts 101, allows reconciliation of logged changes against approved change orders for hosts 101. Reconciliation comprises comparing a set of logged changes against a set of approved change orders. Note that a change log entry 112 may indicate a deployed change, or it may indicate a change attempt that was blocked by an agent 102 and hence was not deployed.

Reconciliation can be used to gain visibility into the intersection of deployed changes and approved changes (i.e. changes corresponding to approved change orders). This supports the notion that deployed changes in the intersection ought to have been authorized, while deployed changes outside the intersection may represent a potential abuse of privilege and/or authorization. On the other hand, reconciliation can be used to help uncover approved but non-deployed changes whose deployments (1) were attempted at some point but were blocked because they lacked authorization (e.g. in enforcement mode), or (2) were attempted and allowed to take effect, even though they lacked authorization (e.g. in tracking mode).

Figure 6:
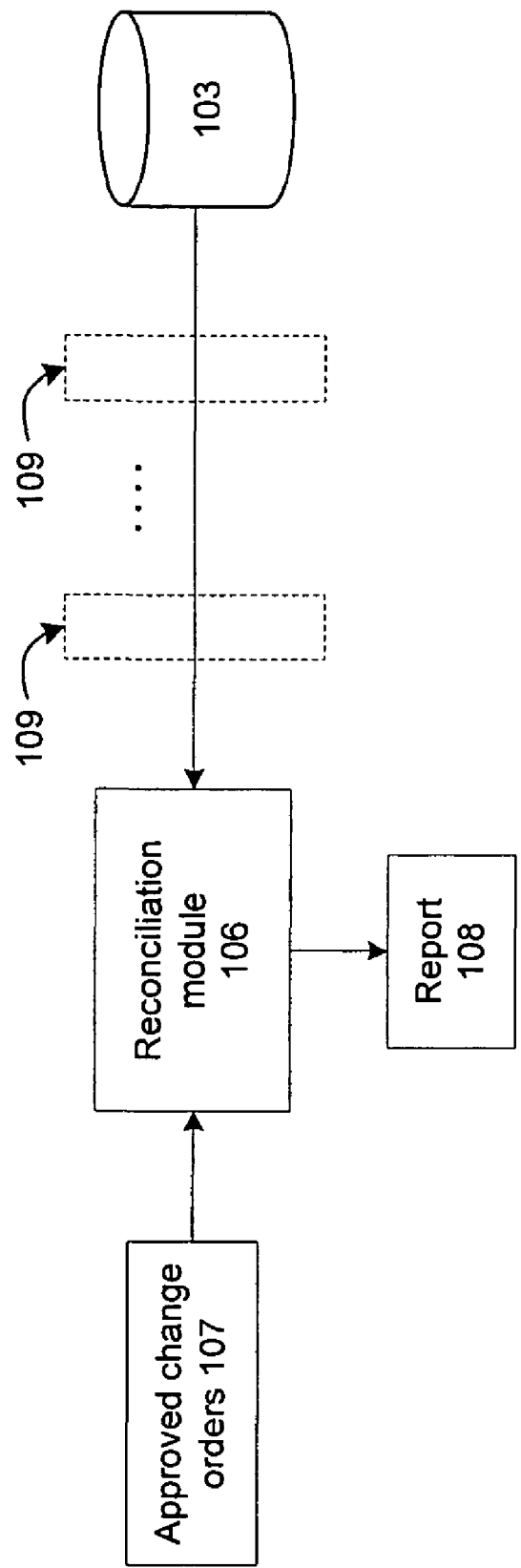
FIG. 6 is a diagram illustrating a system for reconciling logged changes against a set of approved change orders, according to an embodiment of the present invention.

FIG. 6 is a diagram illustrating a system for reconciling logged changes against a set of approved change orders, according to an embodiment of the present invention. A reconciliation module 106 takes as inputs a set of change log entries 112 from aggregated log 103 and a set of approved change orders 107, and can produce a variety of reports 108 by matching change log entries 112 and approved change orders 107. In general, an approved change order 107 may comprise any format and comprise any data that the authors of the change order 107 care to provide, including data corresponding to the above-recited example fields in change log entries 112, such as host, nature of change, time of change, change attributes, change initiator, etc. The difference is that the change log entry 112 data describes a host content change (either requested and already deployed, or requested but blocked by an agent 102), whereas the corresponding approved change order 107 data indicates an approval of a host content change.

Figure 7A:
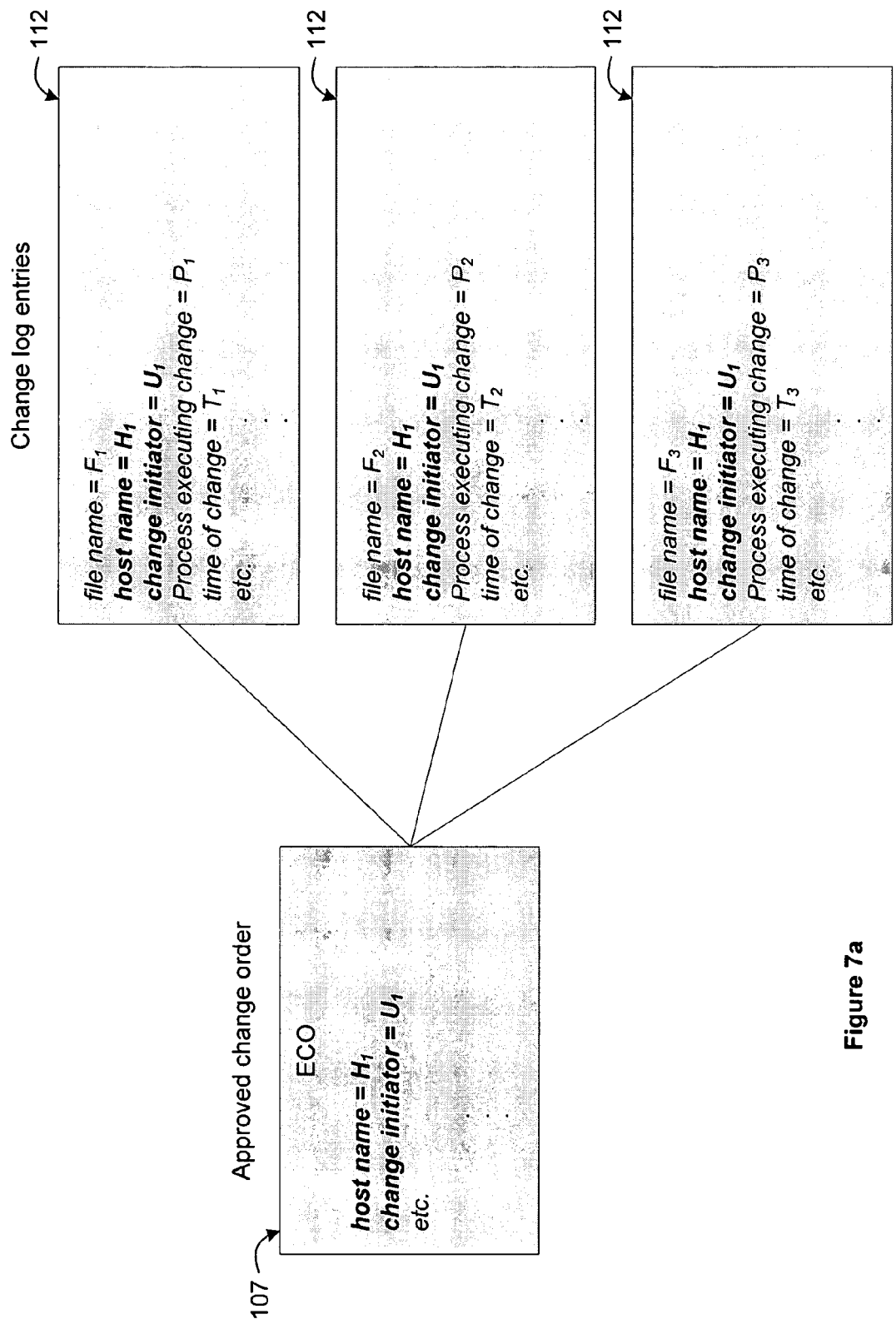
FIG. 7a shows an example of a reconciliation between an approved change order and three change log entries, in accordance with an embodiment of the present invention.

For reconciliation against change log entries 112, a change order 107 may be translated (if necessary) according to a schema that comprises one or more data fields which can be read by reconciliation module 106 and matched against one or more fields in the entries 112 of aggregated log 103. FIG. 7a shows an example of such a matching, wherein a particular change order 107 (denoted ECO) is matched against three change log entries 112 by matching on "host name" and "change initiator" fields present in the change order 107 and the change log entries 112, in accordance with an exemplary embodiment of the present invention. It should be obvious to one or ordinary skill in the art that any fields and any matching logic may be used.

Optionally, the reconciliation module 106 may use one or more filters 109 to narrow the set of change logs that it considers as input, thereby reducing the set of entries that will be subject to reconciliation. For example, a filter 109 may be set to select only change log entries 112 pertaining to a specified set of hosts 101, change log entries 112 pertaining to a specified set of software suites critical to the operation of a set of hosts 101, change log entries 112 that were generated in a specific time window, etc. In practice, it can be particularly useful to set a filter 109 to select only the change log entries 112 that represent a change in one or more host capabilities that are of interest for the particular reconciliation task at hand, wherein capability can be defined with respect to specific software programs and configuration files installed on a host. In general, and as described above, a filter 109 may use any logic to select or filter out change log entries 112, based on any data available in the change logs or in the approved change orders or otherwise available to the filter 109, as will be shown in the examples below.

Figure 7B:
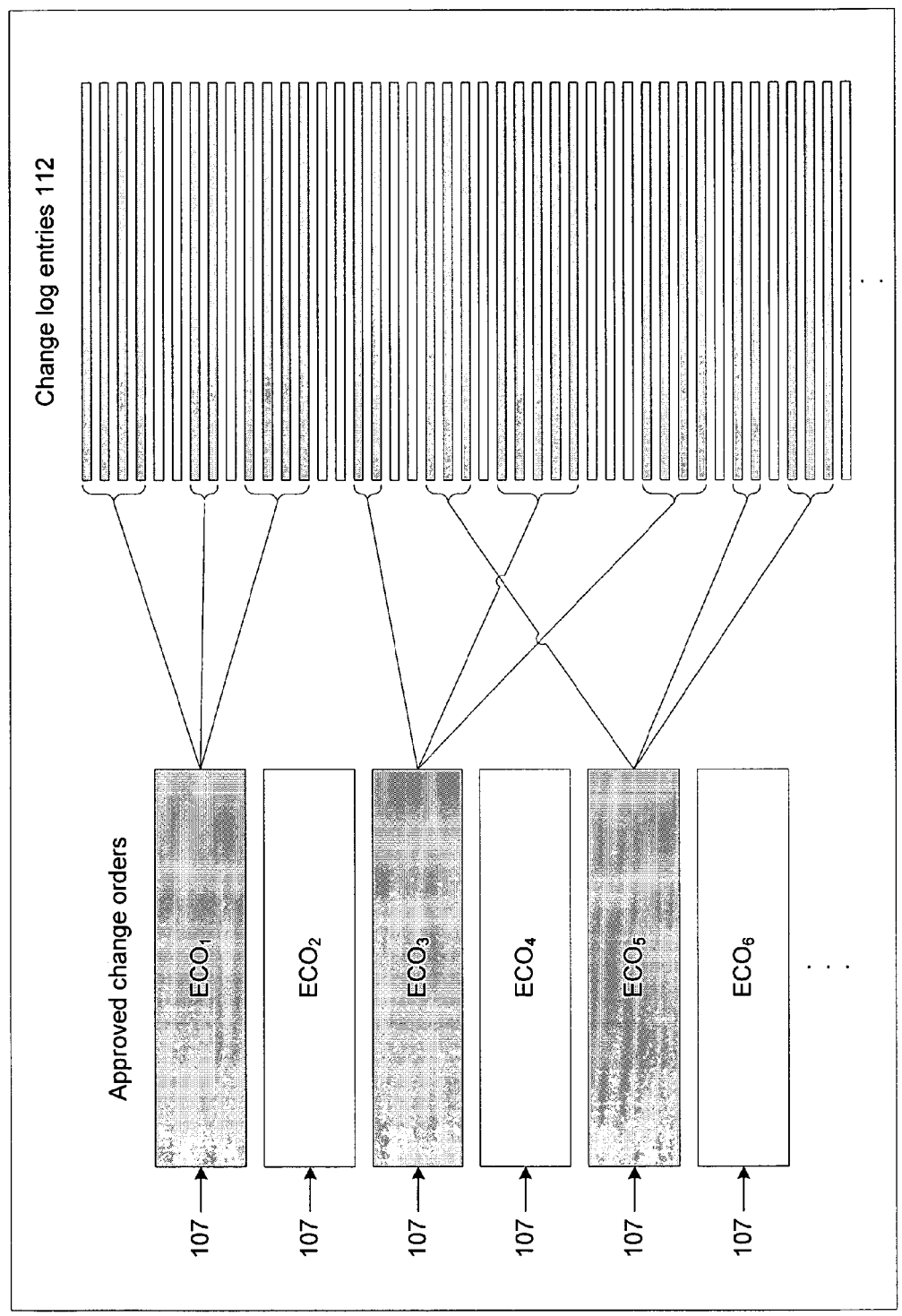
FIG. 7b shows an example of a reconciliation report, in accordance with an embodiment of the present invention.

As mentioned, reconciliation can be used in particular to view the intersection of deployed changes and approved changes and draw attention to any changes that are outside that intersection. FIG. 7b shows an example of a reconciliation report, in accordance with an embodiment of the present invention. The left hand side of the Figure represents a set of approved change orders 107, denoted $ECO_1, \ldots, ECO_6$, while the right hand side represents a set of change log entries 112. The ECOs 107 and the change log entries 112 may span several hosts 101 or they may pertain to a single host 101. The shaded entries on each side represent entries which have been matched to an entry on the opposite side, as represented by match lines between entries on the left and right hand sides. For instance, $ECO_3$ 107 on the left side and a total of eleven change log entries 112 on the right side are matched to each other. The non-shaded entries on each side represent those which have not been matched to any entry on the opposite side.

Advantageously, a graphical user interface may be used to present a report of reconciled entries (as shown in FIG. 7b) to a user. As an alternative to the match lines shown in FIG. 7b, matches may be shown using colors, for example by coloring the shapes representing the ECOs 107 with different colors and coloring the shapes representing the change log entries 112 according to the colors of the ECOs to which they are matched. Instead of colors, patterns or other visual textures can be used to represent matches.

Optionally, a user may be allowed to use one or more user interface elements and mechanisms to select one or more ECOs 107, in response to which the user interface colors (or otherwise indicates as "matches") the selected ECOs 107 and their matching change log entries 112. As another option, a user may select a change log entry 112, in response to which the user interface colors the selected change log entry 112, a matching ECO 107, as well as other change log entries 112 matching the same ECO 107. It should be obvious to one or ordinary skill in the art that other standard matching, sorting and searching functionalities and associated user interface functionalities may be provided as well.

Figure 8A:
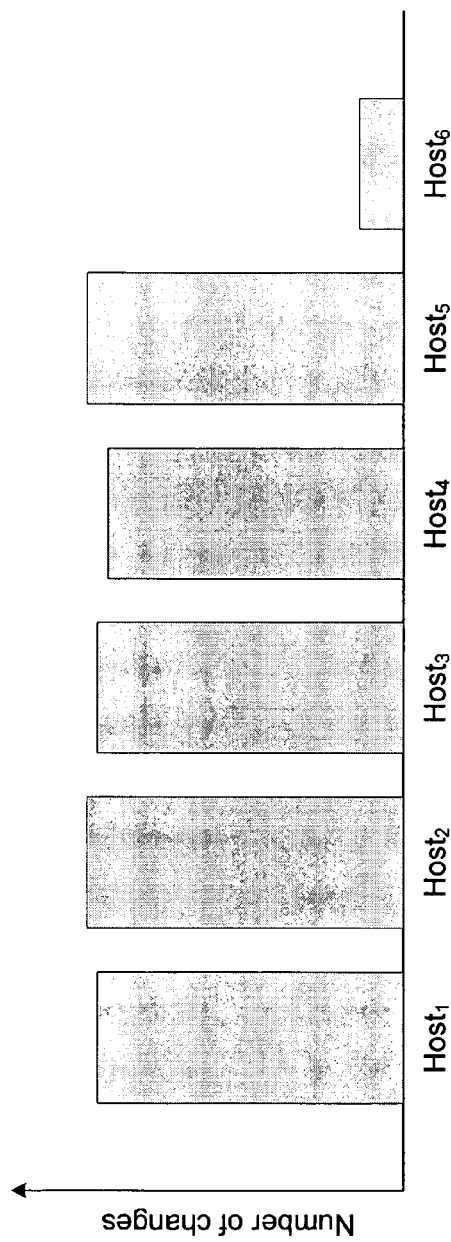
FIG. 8a shows a histogram of logged changes bucketed by host, according to an embodiment of the present invention.

Other representations (and corresponding graphical user interfaces) of logged changes can be useful as well, such as histograms of the change log entries 112 organized into buckets and identifying outliers. One such histogram is shown in FIG. 8a, in accordance with an embodiment of the present invention. In this Figure, change log entries 112 on six hosts, denoted $Host_1, \ldots, Host_6$, are bucketed by host, showing that the first five hosts have had similar numbers of changes whereas $Host_6$ is an outlier and has had comparatively fewer changes. Assuming that all hosts should have had similar number of changes (as may be the case in the particular underlying business practice), $Host_6$ is a candidate for further investigation and corrective and/or preventative action.

Figure 8B:
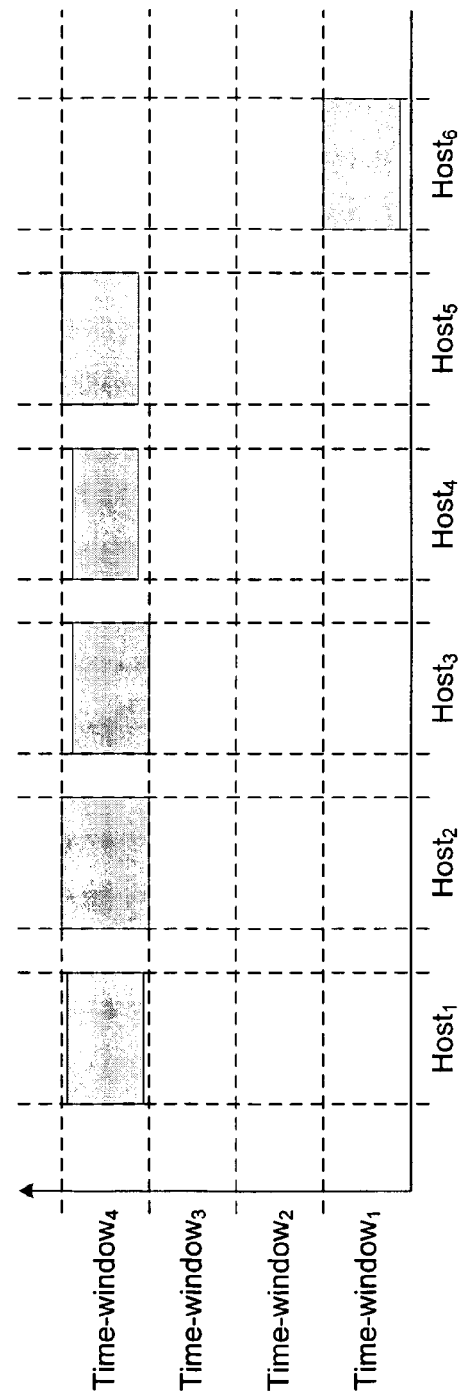
FIG. 8b shows a histogram of logged changes bucketed by host and time windows, according to an embodiment of the present invention.

Another histogram is shown in FIG. 8b, in accordance with an embodiment of the present invention. In this Figure, change log entries 112 are bucketed by host and by time window, showing that the first five hosts have had their changes within $Time-window_4$ whereas changes on $Host_6$ occurred during $Time-window_1$. Once again, assuming that all hosts should have had their changes during the same time window, $Host_6$ is a candidate for further investigation and corrective and/or preventative action. As should be obvious to one or ordinary skill in the art, FIGS. 8a and 8b represent exemplary histograms and in general changes can be bucketed by one or more of hosts, users, time windows, software applications, or any other fields captured by the logs, and corresponding graphical user interfaces can be presented.

While there are many types of reports that can be generated by reconciling change logs against approved change orders, a number of particularly useful and practical examples will be highlighted herein. In one example, the reconciliation module 106 identifies the set of change log entries that do not correspond to any of a set of one or more approved change orders, such as the non-shaded entries on the right hand side of FIG. 7. In an environment where it is desirable or even mandatory that no changes other than those according to approved change orders be deployed on one or more hosts 101, such a reconciliation process provides visibility into the weak points of the existing software change processes, and the enforcement mode of agents 102 provide ways for enforcing approved change orders by putting in place proper change authorization policies.

As another example, reconciliation can identify sets of deployed changes that fail to correspond to any approved change orders, but which are found to fail in similar ways, as the following example illustrates: Consider a set of approved change orders (such as a set of ECOs) which indicate that a user Mary is approved to make a set of changes on one or more hosts 101. However, instead of Mary another user Fred makes those changes instead. Subsequently, reconciliation against the approved change orders finds that the deployed changes fail to be approved, and furthermore that they fail in the same way, namely the change logs 103 indicate that Fred made the changes whereas the approved change orders indicate that only Mary was approved to make those changes. In such a scenario, while the records can be resolved in one of several ways, such as post-facto amendment of the approved change orders, post-facto generation of fresh approved change orders for Fred's changes, or by any other way acceptable to the particular business workflows, what is relevant here is that the present invention can capture and efficiently communicate an otherwise unmanageable set of change data, allowing refinement of policies or processes that may contribute to limiting such occurrences in the future.

Another type of change that a reconciliation process can identify comprises approved change orders that do not correspond to any of the change log entries, such as the unshaded change orders 107 on the left hand side of FIG. 7. In an environment where it is important to gain visibility into which approved change orders are not yet deployed on one or more hosts 101 (i.e. do not have any corresponding deployed changes on the hosts 101), such a reconciliation process provides the desired visibility. Optionally, appropriate changes can be deployed on the affected hosts 101 in order to fulfill the identified approved change orders, thereby moving towards greater consistency between the desired state and the true state of the hosts 101.

Another set of changes that a reconciliation process can identify is the set of changes that are both deployed and correspond to approved change orders, such as the shaded entries in FIG. 7. While ideally this set would include all the deployed changes and all the approved change orders, the present invention provides the tools to move towards this ideal state in a fashion that is automatic, measurable and enforceable.

Another set of changes that a reconciliation process can identify are deployed changes that fall within a time window of one or more ECOs, but do not correspond to any of the ECOs. One way to find such changes is to take a filter that is designed to find changes corresponding to a given ECO and slightly broaden the logic of the filter, such as using wildcards for some of the pieces of data such as the user name.

Another set of changes that a reconciliation process can identify is the set of logged change attempts that (1) were not deployed, because they were blocked by an agent 102 operating in enforcement mode, and (2) do not correspond to any approved change orders. In this case, the reconciliation process affords visibility into what changes would have been deployed on the host 101 had the agent 102 not been operating in enforcement mode. Such information can be valuable for parties that are responsible for the software base, availability, performance, compliance or other state or attribute of a set of hosts 101.

Visibility into the set of attempted or deployed changes on a host allows integration of the software change cycle on hosts and the change workflow for creating and approving change orders. FIG. 9 is a flow diagram illustrating one example where such visibility allows integration of the software change cycle and change workflow, according to an embodiment of the present invention. An attempt to make an unauthorized host content change on a host 101 is intercepted 231 and blocked 232 by an agent 102 in enforcement mode. The agent 102 then generates 233 information which can be used by a change workflow system to create a change order, and makes 233 the information available to the change workflow system. Once the change is approved and the approval reflected via a set of change authorization policies available to the agent 102 on the host 101, a subsequent attempt to initiate the same host content change will not be blocked and can instead be allowed to take effect.

As another example, when a set of one or more changes are allowed to take effect on a host 101 in tracking mode, but at a later reconciliation are not found to correspond to any approved change orders, then a set of change orders can be created to cover the set of tracked and already deployed changes, and the change workflow system may proceed with the processes needed to approve the change orders.

Figure 10:
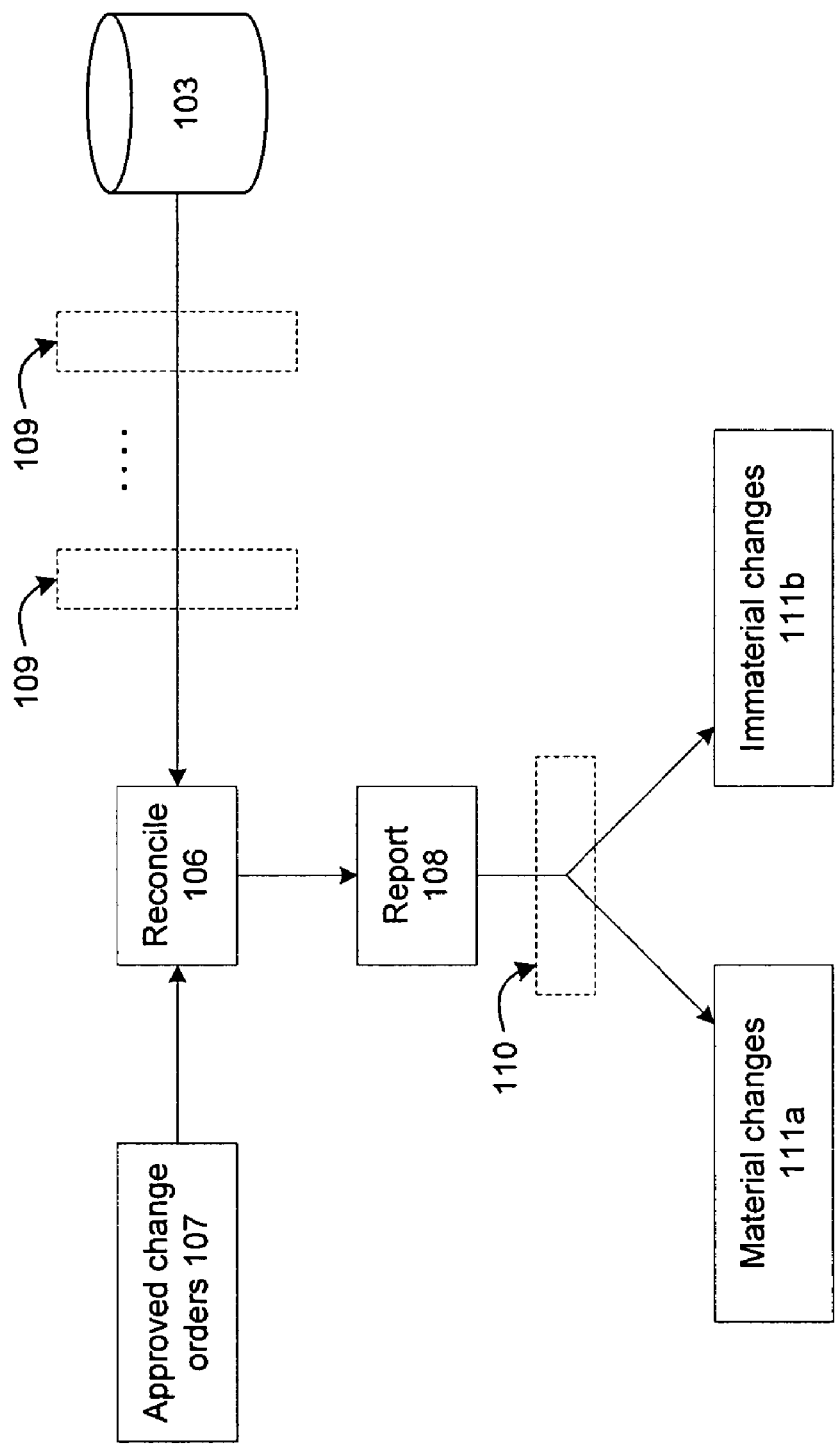
FIG. 10 is a diagram illustrating the division of a set of logged changes into "material" change and "non-material" changes, according to an embodiment of the present invention.

Once a reconciliation report is prepared, an optional additional step comprises dividing the set of change log entries present in the report 108 into two groups, hereinafter referred to as "material" changes 111a and "non-material" changes 111b, as shown in FIG. 10 according to an embodiment of the present invention. A material change is simply one whose change log entry 112 fulfills a set of defined "relevancy criteria" (represented by a filter 110). While the definition of any particular set of relevancy criteria is entirely subjective, it is particularly useful to define the criteria such that they are agnostic to any particular set of change orders, and such that the criteria in effect distinguish between change logs that pertain to persistent objects considered to be of higher importance to the operation and capability of the respective hosts (material changes) and those considered to be of lower importance (non-material changes). Examples of material changes may include: persistent objects used by the operating system (e.g. kernel files, libraries and registry entries), persistent objects used by critical software suites providing critical host capability (e.g. program and configuration files used by a database program on a host deployed as a database server), persistent objects used by host security mechanisms (such as firewall configuration files), etc. Given any set of relevancy criteria, any change that is not material is then considered to be non-material.

Figure 11:
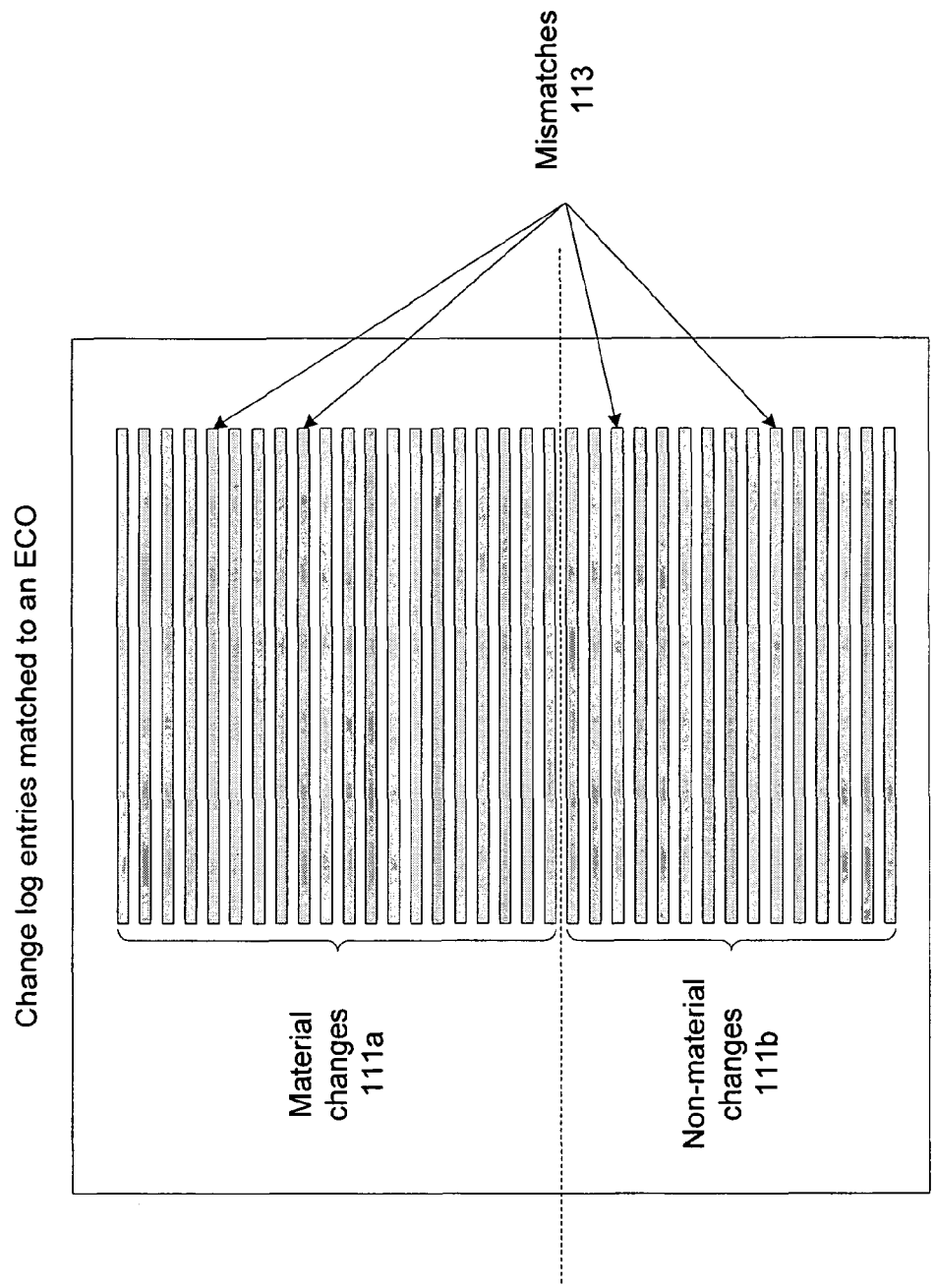
FIG. 11 is an example reconciliation report showing the set of changes matched to a single ECO, in accordance with an embodiment of the present invention.

Once a set of relevancy criteria are defined, they can be used to audit a reconciliation report as follows. FIG. 11 is an example reconciliation report showing the set of change log entries 112 matched to a single ECO, in accordance with an embodiment of the present invention. As shown, there are a total of 35 change log entries 112 which were matched to the ECO, out of which 20 are material changes (as defined by whatever set of "relevancy criteria" happen to be used in this example) and the remaining 15 change log entries 112 are non-material.

Now, while the matching of changes to ECOs occurs based on a set of definitions, from an auditor's perspective some of the matches may be incorrect or inappropriate. For example, FIG. 11 shows four mismatches 113 as identified by a hypothetical auditor. While the non-material mismatches 113 generally do not represent any issues (other than an inaccuracy in the matching process), the mismatches 113 that are classified as material by the relevancy criteria are red flags, since they are material changes whose deployment is being inaccurately represented as a part of an ECO fulfillment.

An example set of changes that a reconciliation coupled with relevancy criteria can identify are material changes that do not fall within any time window defined by any ECO. Since such changes most likely represent out-of-process changes and should be dealt with properly, it will be advantageous to periodically look for them in the aggregate logs 103.

Optionally, a set of relevancy criteria can be used to define an "inventory" of persistent objects comprising persistent objects that are material for the operation of a host 101. An agent 102 in enforcement mode can then be used to protect the objects in the inventory from unauthorized changes.

Discovery

The visibility into change patterns that is provided by the embodiments of the present invention enables inference of change processes and thereby a starting point for the definition of robust authorization policies. Starting with a set of change log entries 112 and a preliminary set of authorization policies, the change log entries 112 can be divided into authorized and unauthorized changes according to the preliminary authorization policies. Such post-facto analysis in effect shows which changes would have been blocked had the authorization policies been in place on a host 101 with an agent 102 operating in enforcement mode. The authorization policies can then be adjusted and re-analyzed until a level of confidence is obtained. Once a set of authorization policies are prepared, they can be tested against live changes on a host 101 with an agent 102 operating in tracking mode (i.e. during a "mock" enforcement period), or they can be put into enforcement on a host 101 with an agent 102 operating in enforcement mode.

It should be obvious to one or ordinary skill in the art that the logs can be analyzed based on any combination of the following: information recorded in the logs about the changed persistent objects themselves; information recorded in the logs about the entities that initiated the changes; information recorded in the logs about the circumstances surrounding the changes, such as time of change and environment settings at time of change; etc.

One typical usage comprises maximizing the number of changes that are classified as authorized in the post-facto analysis. This approach is useful when the existing change patterns are believed to be proper and the objective is to minimize the impact of the authorization policy enforcement on the existing change activity patterns. Another typical usage comprises matching the division of changes into authorized and unauthorized buckets as closely as possible to existing knowledge about which changes should be in which bucket. This approach is useful when such knowledge exists and is deemed reliable.

Debugging

In tracking mode embodiments of the present invention, and by extension in enforcement mode embodiments, the logging of host content changes deployed on one or more hosts effectively provides a set of one or more change timelines that can be used as a debugging tool. As one example, if a bug is suspected to have initially appeared on a host during a certain time window, the set of deployed changes can be examined to reveal what objects changed during that time window, thereby allowing a debugger to narrow the investigation for the set of objects that contribute to the bug.

As another example, if the same software update is deployed onto several hosts, and one of the hosts is subsequently found to have a bug suspected to have resulted from the software update, then the set of tracked deployed changes of the hosts can be compared to isolate differences between the host with the bug and the other hosts. In general, the timeline of deployed changes on one or more hosts can be used, in conjunction with searching and sorting techniques, to effectively and precisely navigate the tracked deployed changes and more quickly find those that are of interest.

Foregoing described embodiments of the invention are provided as illustrations and descriptions. They are not intended to limit the invention to precise form described. In particular, it is contemplated that functional implementation of components of this invention described herein may be implemented in the operating system kernel or in user space, as well as equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method to be executed by a processor, comprising:
   intercepting a host content change request indicating a change to a persistent object on a host computer;

determining whether the change is authorized, as indicated by a set of change authorization policies;

allowing the change to take effect when the change is authorized;

blocking the change from taking effect when the change is not authorized;

logging information about the host content change request;

obtaining a log representing a set of host content change requests;

comparing the log to a set of approved change orders for any one or more of a plurality of persistent objects on the host computer;

identifying at least one correlation between the set of host content change requests and the set of approved change orders; and providing user-readable data representing the at least one correlation, wherein the set of change authorization policies is configurable to define whether the persistent object can be changed.

2. The method of claim 1, wherein at least one policy of the set of change authorization policies is selected from the group consisting of:

a set of persistent objects that can be changed without restriction;

a set of users, programs or entities that can make changes to a specified set of persistent objects; and a set of users, programs or entities that can make changes to the specified set of persistent objects during one or more specified time windows.

3. The method of claim 1, wherein the determining, the allowing and the blocking are performed in real-time.

4. The method of claim 1, further comprising:

filtering the host content change request to prevent logging the host content change request if the host content change request is non-material.

5. The method of claim 4, wherein the host content change request is non-material if the host content change request includes one or more of:

creation of specified registry entries;

modification of specified registry entries; and creation, deletion, or modification of temporary objects.

6. Logic encoded in one or more non-transitory computer readable media having computer-executable instructions and when executed by a processor is operable to perform operations comprising:

intercepting a host content change request indicating a change to a persistent object on a host;

determining whether the change is authorized, as indicated by a set of change authorization policies;

allowing the change to take effect when the change is authorized;

blocking the change from taking effect when the change is not authorized;

logging information about the host content change request;

obtaining a log representing a set of host content change requests;

comparing the log to a set of approved change orders for any one or more of a plurality of persistent objects on the host;

identifying at least one correlation between the set of host content change requests and the set of approved change orders; and providing user-readable data representing the at least one correlation, wherein the set of change authorization policies is configurable to define whether the persistent object can be changed.

7. The logic of claim 6, wherein at least one policy of the set of change authorization policies is selected from the group consisting of:

a set of persistent objects that can be changed without restriction;

a set of users, programs or entities that can make changes to a specified set of persistent objects; and a set of users, programs or entities that can make changes to the specified set of persistent objects during one or more specified time windows.

8. The logic of claim 6, wherein the determining, the allowing and the blocking are performed in real-time.

9. The logic of claim 6, wherein the operations further comprise:

filtering the host content change request to prevent logging the host content change request if the host content change request is non-material.

10. The logic of claim 9, wherein the host content change request is non-material if the host content change request includes one or more of:

creation of specified registry entries;

modification of specified registry entries; and creation, deletion, or modification of temporary objects.

11. A host, comprising:

a memory element for storing a set of change authorization policies; and a processor operable to execute instructions associated with a management module, including:

intercepting a host content change request indicating a change to a persistent object on the host;

determining whether the change is authorized, as indicated by the set of change authorization policies;

allowing the change to take effect when the change is authorized; and blocking the change from taking effect when the change is not authorized logging information about the host content change request;

obtaining a log representing a set of host content change requests;

comparing the log to a set of approved change orders for any one or more of a plurality of persistent objects on the host;

identifying at least one correlation between the set of host content change requests and the set of approved change orders; and providing user-readable data representing the at least one correlation, wherein the set of change authorization policies is configurable to define whether the persistent object can be changed.

12. The host of claim 11, wherein at least one policy of the set of change authorization policies is selected from the group consisting of:

a set of persistent objects that can be changed without restriction;

a set of users, programs or entities that can make changes to a specified set of persistent objects; and a set of users, programs or entities that can make changes to the specified set of persistent objects during one or more specified time windows.

13. The host of claim 11, wherein the instructions associated with the management module further include:

filtering the host content change request to prevent logging the host content change request if the host content change request is non-material.

14. The host of claim 13, wherein the host content change request is non-material if the host content change request includes one or more of:
   creation of specified registry entries;
   modification of specified registry entries; and
   creation, deletion, or modification of temporary objects.

15. A method to be executed by a processor, comprising:
   intercepting a host content change request indicating a change to a persistent object on a host computer;
   determining whether the change is authorized, as indicated by a set of change authorization policies;
   allowing the change to take effect when the change is authorized;
   logging information about the host content change request;
   obtaining a log representing a set of change requests for at least one persistent object of a plurality of persistent objects on the host computer;
   comparing the log to a set of approved change orders for any one or more of the plurality of persistent objects;
   identifying one or more discrepancies between the set of change requests and the set of approved change orders; and
   providing user-readable data representing the one or more discrepancies.

16. The method of claim 15, wherein at least one of the one or more discrepancies is selected from a group of discrepancies, the group consisting of:
   a change request that does not correspond to any approved change orders; and
   an approved change order that does not correspond to any change requests.

17. The method of claim 15, wherein at least one change request was blocked in response to a set of authorization policies indicating that the at least one change request was not authorized.

18. The method of claim 15, wherein at least one change request was executed resulting in a deployed change to the at least one persistent object, wherein the execution occurred in response to a set of authorization policies indicating that the at least one change request was authorized.

19. The method of claim 15, wherein the user-readable data indicates whether the one or more discrepancies include a change request that was executed resulting in a deployed change to one of the persistent objects.

20. The method of claim 15, wherein the user-readable data is a display generated on a display device.

21. The method of claim 15, further comprising:
   selecting a specified set of log entries from the log according to one or more criteria, wherein the comparing the log to a set of approved change orders includes comparing only the specified set of log entries to the set of approved change orders.

22. The method of claim 21, wherein the one or more criteria are selected from a group of criteria comprising a specified set of host computers, a specified set of software, and a specified time window.

23. Logic encoded in one or more non-transitory computer readable media that includes code for execution and when executed by a processor is operable to perform operations comprising:
   intercepting a host content change request indicating a change to a persistent object on a host;
   determining whether the change is authorized, as indicated by a set of change authorization policies;
   allowing the change to take effect when the change is authorized;
   logging information about the host content change request;
   obtaining a log representing a set of change requests for at least one persistent object of a plurality of persistent objects on a host;
   comparing the log to a set of approved change orders for any one or more of the plurality of persistent objects;
   identifying one or more discrepancies between the set of change requests and the set of approved change orders; and
   providing user-readable data representing the one or more discrepancies.

24. The logic of claim 23, wherein at least one of the one or more discrepancies is selected from a group of discrepancies, the group consisting of:
   a change request that does not correspond to any approved change orders; and
   an approved change order that does not correspond to any change requests.

25. The logic of claim 23, wherein at least one change request was blocked in response to a set of change authorization policies indicating that the at least one change request was not authorized.

26. The logic of claim 23, wherein at least one change request was executed resulting in a deployed change to the at least one persistent object, wherein the execution occurred in response to a set of change authorization policies indicating that the at least one change request was authorized.

27. The logic of claim 23, wherein the user-readable data indicates whether the one or more discrepancies include a change request that was executed resulting in a deployed change to one of the persistent objects.

28. A host, comprising:
   a memory element configured to store a log representing a set of change requests for at least one persistent object of a plurality of persistent objects on a host; and
   a processor operable to execute instructions associated with a reconciliation module, including:
      intercepting a host content change request indicating a change to a persistent object on a host;
      determining whether the change is authorized, as indicated by a set of change authorization policies;
      allowing the change to take effect when the change is authorized;
      logging information about the host content change request;
      obtaining the log representing the set of change requests;
      comparing the log to a set of approved change orders for any one or more of the plurality of persistent objects;
      identifying one or more discrepancies between the set of change requests and the set of approved change orders; and
      providing user-readable data representing the one or more identified discrepancies.

29. The host of claim 28, wherein at least one of the one or more discrepancies is selected from a group of discrepancies, the group consisting of:
   a change request that does not correspond to any approved change orders; and
   an approved change order that does not correspond to any change requests.

30. The host of claim 28, wherein at least one change request was blocked in response to a set of change authorization policies indicating that the at least one change request was not authorized.

31. The host of claim 28, wherein at least one change request was executed resulting in a deployed change to the at least one persistent object, wherein the execution occurred in response to a set of change authorization policies indicating that the at least one change request was authorized.

32. The host of claim 28, wherein the user-readable data indicates whether the one or more discrepancies include a change request that was executed resulting in a deployed change to one of the persistent objects.

33. The method of claim 1, further comprising:
selecting a specified set of log entries from the log according to one or more criteria, wherein the comparing the log to a set of approved change orders includes comparing only the specified set of log entries to the set of approved change orders.

34. The method of claim 33, wherein the one or more criteria are selected from a group of criteria comprising a specified set of host computers, a specified set of software, and a specified time window.

* * * * *

UNITED STATES PATENT AND TRADEMARK OFFICE
CERTIFICATE OF CORRECTION

| | |
|---|---|
| PATENT NO. | : 8,234,713 B2 |
| APPLICATION NO. | : 12/640098 |
| DATED | : July 31, 2012 |
| INVENTOR(S) | : Rahul Roy-Chowdhury et al. |

It is certified that error appears in the above-identified patent and that said Letters Patent is hereby corrected as shown below:

At column 16, line 38, claim 11, delete "authorized; and" and insert -- authorized; --, therefor.

At column 16, line 40, claim 11, delete "authorized" and insert -- authorized; --, therefor.

Signed and Sealed this
Fourth Day of September, 2012

David J. Kappos
*Director of the United States Patent and Trademark Office*